US007779123B2

(12) United States Patent
Duggan

(10) Patent No.: US 7,779,123 B2
(45) Date of Patent: Aug. 17, 2010

(54) SYSTEM AND METHOD FOR BUILDING NETWORK MODEL IN NETWORK MANAGEMENT APPLICATION

(75) Inventor: Matthew Edward Duggan, Chertsey (GB)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/138,520

(22) Filed: Jun. 13, 2008

(65) Prior Publication Data

US 2009/0313362 A1 Dec. 17, 2009

(51) Int. Cl.
*G06F 15/173* (2006.01)
*G06F 9/46* (2006.01)

(52) U.S. Cl. ............... 709/224; 709/228; 709/241; 370/401; 370/392; 718/102

(58) Field of Classification Search .......... 709/224, 709/228, 241; 370/392, 401; 718/102
See application file for complete search history.

(56) References Cited

U.S. PATENT DOCUMENTS

| 7,197,040 | B2 * | 3/2007 | Bressoud et al. ............ 370/401 |
| 7,200,122 | B2 | 4/2007 | Goringe et al. |
| 7,386,459 | B2 * | 6/2008 | English ..................... 705/1.1 |
| 2002/0032769 | A1 * | 3/2002 | Barkai et al. ............... 709/224 |
| 2003/0016672 | A1 * | 1/2003 | Rosen et al. ................ 370/392 |
| 2005/0004804 | A1 * | 1/2005 | English ...................... 705/1 |
| 2006/0198321 | A1 | 9/2006 | Nadeau et al. |
| 2008/0040499 | A1 * | 2/2008 | English ..................... 709/231 |

OTHER PUBLICATIONS

Andersen et al, "Topology inference from BGP routing dynamics," Proc. of ACM SIGCOMM Internet Measurement Workshop, Marseille, France, 2002, 6 pages.
Culpin, G., "Discovery of Internet topology through active probing," Thesis. Catholic Univ. of Louvain. Aug. 2006, 137 pages.
Dimitropoulos et al, "Revisiting Internet AS-level topology discovery," in Lecture Notes in Computer Science, vol. 3431 (2005), 13 pages.
Govindan et al., "Heuristics for internet map discovery," IEEE INFOCOM 2000, 11 pages.
She et al, "Passive inter-domain routing monitor based on routing interaction," in CIT'06, Proc. 6th IEEE Int. Conf. on Computer and Information Technology (2006), 6 pages.
Spring et al, "Measuring ISP topologies with Rocketfuel," IEEE/ACM Trans. on Networking vol. 12, No. 1, Feb. 2004, 15 pages.
Yu et al, "A distributed architecture for Internet router level topology discovering systems," in PDCAT'2003. Proceedings of the Fourth Int. Conf. on Parallel and Distributed Computing, Applications and Technologies, IEEE, pp. 47-51.

* cited by examiner

*Primary Examiner*—Khanh Q Dinh
(74) *Attorney, Agent, or Firm*—Stephen J. Walder, Jr.; Jeffrey S. LaBaw

(57) ABSTRACT

A system and associated method for building a network model of a network for a network management application. The network management application discovering a router discovers peering routers using network reachability information in a routing protocol. Undiscoverable peering routers are created within the network model by the network management application from network reachability information. Also a local subnet for the router, a remote subnet for a peer, a remote interface between the router and the peer also may be created to model the network in a network management application from information from the routing protocol.

20 Claims, 6 Drawing Sheets

EXAMPLE BORDER GATEWAY PROTOCOL (BGP) NETWORK
300

PEER ENTRY IN CONFIGURATION DATA OF ROUTER
IN BGP NETWORK
170

| bgpLocalAs 171 |
| bgpPeerIdentifier 172 |
| bgpPeerState 173 |
| bgpPeerLocalAddr 174 |
| bgpPeerRemoteAddr 175 |
| bgpPeerRemoteAs 176 |

FIG. 1A

EXAMPLE BORDER GATEWAY PROTOCOL (BGP) NETWORK
300

EXAMPLE PEER ENTRIES IN CONFIGURATION DATA OF
PEER4 IN EXAMPLE BGP NETWORK OF FIG. 3
314E

| 31411 64512 | 31421 64512 | 31431 64512 | 31451 64512 |
| --- | --- | --- | --- |
| 31412 PEER1 | 31422 PEER2 | 31432 PEER3 | 31452 PEER5 |
| 31413 Established | 31423 Established | 31433 Established | 31453 Established |
| 31414 172.20.1.7 | 31424 172.20.1.7 | 31434 172.20.1.7 | 31454 10.10.10.1 |
| 31415 172.20.1.5 | 31425 172.20.1.4 | 31435 172.20.1.6 | 31455 10.10.10.2 |
| 31416 64512 | 31426 64512 | 31436 64512 | 31456 64513 |

FIG. 3A

SYSTEM AND METHOD FOR BUILDING NETWORK MODEL IN NETWORK MANAGEMENT APPLICATION

FIELD OF THE INVENTION

The present invention discloses a system and associated method for enabling network management applications to build a network model with network entities that are not accessible by a network management application via network management protocols.

BACKGROUND OF THE INVENTION

Conventional network management applications typically construct a model of the managed network resources and relationships using data retrieved from devices in the network by discovery processes within a network management application.

Because an accurate network model is imperative for network management and administration, it is desirable to discover as many network resources and relationships as possible. However, discovery processes within conventional network management applications have limitations in discovering network resources and relationships that are connected to a managed resource but are not under administrative control of the conventional network management applications.

Thus, there is a need for a system and associated method that enables a network management application to discover and model information about network resources and relationships that are either not reachable or accessible or that are not under the administrative control of the user of a network management application.

SUMMARY OF THE INVENTION

The present invention provides a method for building a network model of a network for a network management application, the method comprising:

selecting a connection between a router and a peer, wherein the network model comprises the router, wherein the connection is made pursuant to a routing protocol of the network;

subsequent to said selecting, adding, to the network model, a first subnet comprising the router and a second subnet;

subsequent to said adding, specifying, in the network model, a local address of the router that identifies the router in the connection, and a local interface of the router that indicates a local termination point of the connection used with the local address;

subsequent to said specifying, inserting, in the network model, the peer and a remote address of the peer that identifies the peer in the connection, and a remote interface of the peer that indicates a remote termination point of the connection used with the remote address;

subsequent to said inserting, confirming that the second subnet comprises the peer in the network model;

subsequent to said confirming, appending a new connection between the local interface and the remote interface to the network model; and subsequent to said appending, transmitting the network model to an output device of a computer system, wherein said selecting, said adding, said specifying, said inserting, said confirming, said appending, and said transmitting are performed by the network management application running on the computer system.

The present invention provides a computer program product, comprising a computer usable storage medium having a computer readable program code embodied therein, said computer readable program code containing instructions that when executed by a processor of a computer system implement a method for building a network model of a network for a network management application, the method comprising:

selecting a connection between a router and a peer, wherein the network model comprises the router, wherein the connection is made pursuant to a routing protocol of the network;

subsequent to said selecting, adding, to the network model, a first subnet comprising the router and a second subnet;

subsequent to said adding, specifying, in the network model, a local address of the router that identifies the router in the connection, and a local interface of the router that indicates a local termination point of the connection used with the local address;

subsequent to said specifying, inserting, in the network model, the peer and a remote address of the peer that identifies the peer in the connection, and a remote interface of the peer that indicates a remote termination point of the connection used with the remote address;

subsequent to said inserting, confirming that the second subnet comprises the peer in the network model;

subsequent to said confirming, appending a new connection between the local interface and the remote interface to the network model; and subsequent to said appending, transmitting the network model to an output device of a computer system, wherein said selecting, said adding, said specifying, said inserting, said confirming, said appending, and said transmitting are performed by the network management application running on the computer system.

The present invention provides a computer system comprising a processor and a computer readable memory unit coupled to the processor, said memory unit containing instructions that when executed by the processor implement a method for building a network model of a network for a network management application, the method comprising:

selecting a connection between a router and a peer, wherein the network model comprises the router, wherein the connection is made pursuant to a routing protocol of the network;

subsequent to said selecting, adding, to the network model, a first subnet comprising the router and a second subnet;

subsequent to said adding, specifying, in the network model, a local address of the router that identifies the router in the connection, and a local interface of the router that indicates a local termination point of the connection used with the local address;

subsequent to said specifying, inserting, in the network model, the peer and a remote address of the peer that identifies the peer in the connection, and a remote interface of the peer that indicates a remote termination point of the connection used with the remote address;

subsequent to said inserting, confirming that the second subnet comprises the peer in the network model;

subsequent to said confirming, appending a new connection between the local interface and the remote interface to the network model; and subsequent to said appending, transmitting the network model to an output device of a computer system, wherein said selecting, said adding, said specifying, said inserting, said confirming, said appending, and said transmitting are performed by the network management application running on the computer system.

The present invention provides a method and system that overcomes at least one of the current disadvantages of conventional method and system for modelling a network in a network management application.

BRIEF DESCRIPTION OF THE DRAWINGS

FIG. 1A illustrates a peer entry in configuration data of a router in the BGP network of FIG. 1, in accordance with embodiments of the present invention.

FIG. 3A illustrates an example configuration data for Peer4 of AS64512 in the BGP network of FIG. 3, in accordance with embodiments of the present invention.

DETAILED DESCRIPTION OF THE INVENTION

Figure 1:
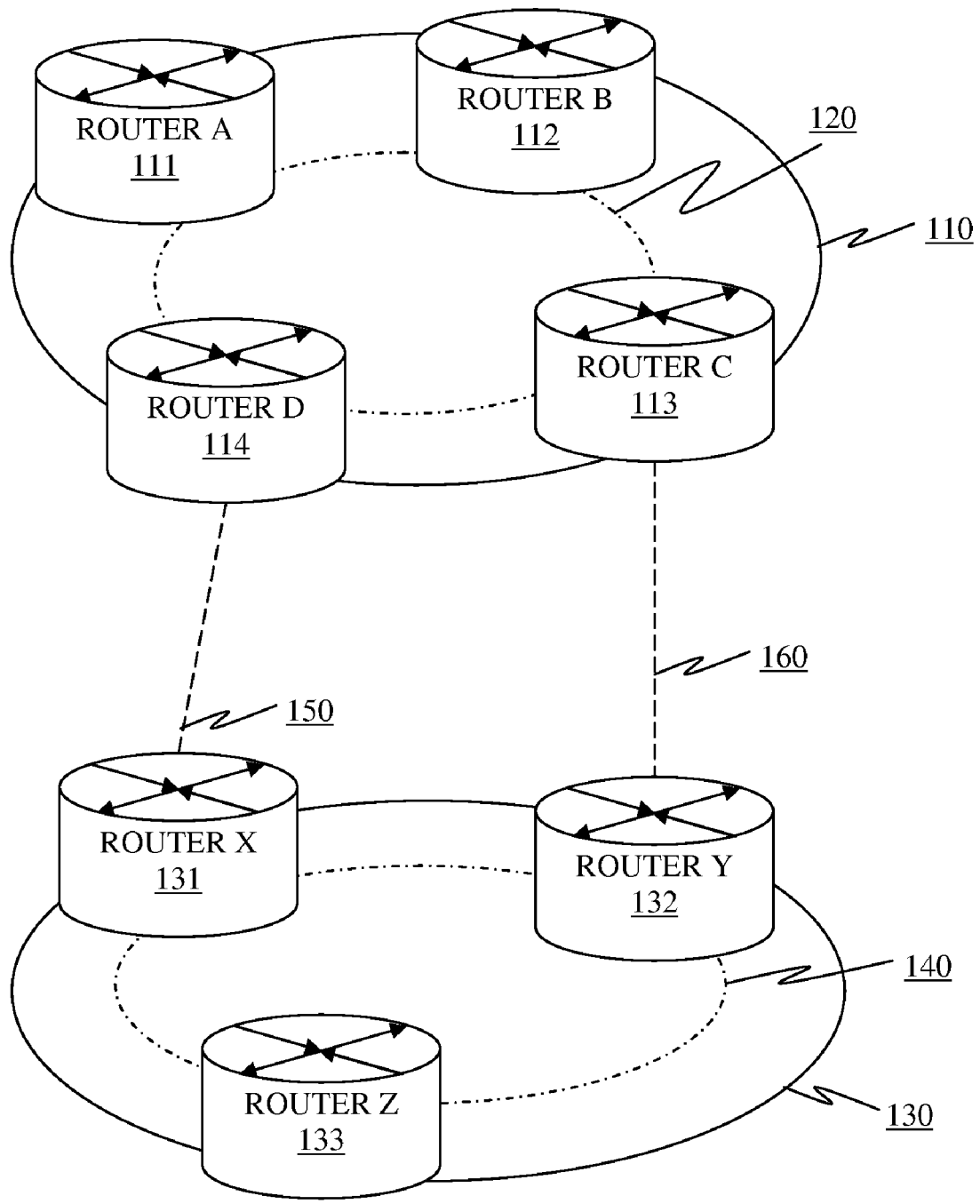
FIG. 1 illustrates a Border Gateway Protocol (BGP) network, in accordance with embodiments of the present invention.

FIG. 1 illustrates a Border Gateway Protocol (BGP) network 100, in accordance with embodiments of the present invention.

The Border Gateway Protocol (BGP) is an inter-Autonomous System (AS) routing protocol that enables Internet Service Providers (ISPs) to connect respective Autonomous Systems (ASes) with one another in forming the Internet. The BGP is a Network Layer (Layer 3) protocol in the Open Systems Interconnection (OSI) reference model. The BGP network 100 comprises a first Autonomous Systems (AS) 110 and a second Autonomous Systems (AS) 130.

An Autonomous System (AS) is an operating unit comprising a set of routers under a single technical administration of a BGP network. Routers in an AS use the interior gateway protocol (IGP) and common metrics to determine how to route packets within the AS, and use an inter-AS routing protocol to determine how to route packets to other ASes. There may be multiple IGPs and sets of metrics within an AS that is a coherent interior routing plan presenting a consistent picture of the destinations that are reachable through the AS. The ASes are interconnected through the External Border Gateway Protocol (eBGP) connections. The first AS 110 and the second AS 130 are connected via a first eBGP connection 150 and a second eBGP connection 160. The first eBGP connection 150 connects router D 114 of the first AS 110 and router X 131 of the second AS 130. The second eBGP connection 160 connects router C 113 of the first AS 110 and router Y 132 of the second AS 130.

The first AS 110 in the BGP network 100 comprises router A 111, router B 112, router C 113, and router D 114. All routers within the first AS 110 are connected to one another using the Internal Border Gateway Protocol (iBGP) and the Interior Gateway Protocol (IGP) 120. Examples of the IGP may be, inter alia, the Intermediate System to Intermediate System (IS-IS), the Open Shortest Path First (OSPF), the Routing Information Protocol (RIP), etc.

The second AS 130 in the BGP network 100 comprises router X 131, router Y 132, and router Z 133. All routers within the second AS 130 are connected to one another using the Internal Border Gateway Protocol (iBGP) and the Interior Gateway Protocol (IGP) 140.

All routers 111, 112, 113, 114, 131, 132, 133 in the BGP network 100 exchange information on whether other routers existing internally within the BGP network 100 and externally with other BGP networks are reachable at the Network Layer, that is referred to as network reachability information. The network reachability information is transferred within the Network Layer Reachability Information (NLRI) field of UPDATE messages of the BGP for routing update advertisement. For details on the NLRI, see Request for Comments (RFC) 4271 published by the Internet Engineering Task Force (IETF®).

The network reachability information includes connection information on the list of Autonomous Systems (ASes) that an UPDATE message containing the NLRI traverses. Using the network reachability information, network management applications in ASes constructs a network connectivity model for the ASes. The network connectivity model is used for multiple network management purposes, inter alia, re-routing among ASes and/or enforcing a routing policy decision, etc. To construct a more accurate network connectivity model, network management applications typically provide discovery capabilities that find networks and devices and gather information.

Network management applications use Application Layer protocols (Layer 7) in the Open Systems Interconnection (OSI) model or equivalently high-level protocols for network management. Examples of high-level protocols used in network management applications may be, inter alia, the Telnet, the Secure Shell (SSH), the Simple Network Management Protocol (SNMP), the Transaction Language 1 (TL1), etc. The network and device discovery capabilities are configured by a user of a network management application and/or an administrator of a network to specify, inter alia, whether the discovery capability is enabled or disabled, which devices should be discovered by providing Internet Protocol (IP) subnets and/or device types, device access credentials indicating how to access devices and what kind of information can be retrieved from the accessed device, etc. In a typical network management procedure, the discovery for network resources may be performed periodically pursuant to a management schedule, on-demand, and/or in response to a predefined network event.

The accuracy of the network model constructed by a network management application depends on the discovery processes which are subject to a number of factors that determine whether or not data can be retrieved from the network resources. Examples of factors may be, inter alia, configuration of the network management application specifying whether or not a network resource is in discovery scope, the access credentials for network management protocols used by the network management application to retrieve data from network resources, and network reachability information representing whether or not a network resource is reachable by the management application for querying at the time of discovery.

The accuracy of network models also depends on having information about network resources that are connected to a managed network resource but are not under administrative control of the network management application. In this embodiment, the Border Gateway Protocol (BGP) data provides information about network resources in Autonomous Systems (ASes) that exchanges network reachability information with other BGP network systems and among Internet Service Provider's (ISP).

An Autonomous System (AS) is considered to be a network or group of networks under a common technical administration, with one or more Interior Gateway Protocol (IGP) routing protocols, common routing policies within the AS and an exterior gateway protocol such as BGP to route data to other AS. In this specification, the term subnet is defined as a generic sub-network of any network system. A subnet may be, inter alia, a part of an Autonomous System (AS) of a Border Gateway Protocol (BGP) network system, etc.

FIG. 1A illustrates a peer entry 170 in configuration data of a router in the Border Gateway Protocol (BGP) network of FIG. 1, supra, in accordance with embodiments of the present invention.

The peer entry 170 in configuration data of a router comprises data values selected from Managed Objects for the Fourth Version of the Border Gateway Protocol (BGP-4), often referred to as the BGP-4 Management Information Base (BGP-4 MIB), as defined in Request for Comments (RFC) 1657 by the Internet Engineering Task Force (IETF®).

The peer entry 170 is associated with a peer of the router. The peer entry 170 for the peer identifies the peer of the router and describes a connection between the router and the peer. The peer entry 170 comprises a bgpLocalAs 171 value, a bgpPeerIdentifier 172 value, a bgpPeerState 173 value, a bgpPeerLocalAddr 174 value, a bgpPeerRemoteAddr 175 value, and a bgpPeerRemoteAs 176 value.

The bgpLocalAs 171 value identifies the local AS in which the router is administered. The bgpLocalAs 171 value is in an Autonomous Systems Number (ASN) format, that is a 16-bit integer.

The bgpPeerIdentifier 172 value identifies a peer of the router. The bgpPeerState 173 value, the bgpPeerLocalAddr 174 value, the bgpPeerRemoteAddr 175 value, and the bgpPeerRemoteAs 176 value in the peer entry 170 describes a connection between the router and the peer identified by the bgpPeerIdentifier 172 value.

The bgpPeerState 173 value represents a state of the connection between the router and the peer identified by the bgpPeerIdentifier 172 value. The state of the connection may be, inter alia, 'idle' (1), 'connect' (2), 'active' (3), 'opensent' (4), 'openconfirm' (5), and 'established' (6).

The bgpPeerLocalAddr 174 value represents a local Internet Protocol (IP) address of the connection to the peer identified by the bgpPeerIdentifier 172 value. The bgpPeerLocalAddr 174 value is the address that the router uses to reach the peer.

The bgpPeerRemoteAddr 175 value represents a remote Internet Protocol (IP) address of the connection to the peer identified by the bgpPeerIdentifier 172 value. The bgpPeerRemoteAddr 175 value is the address that the peer uses to reach the router.

The bgpPeerRemoteAs 176 value identifies the remote AS in which the peer identified by the bgpPeerIdentifier 172 value is administered. The bgpPeerRemoteAs 176 value is in the ASN format.

Figure 2:
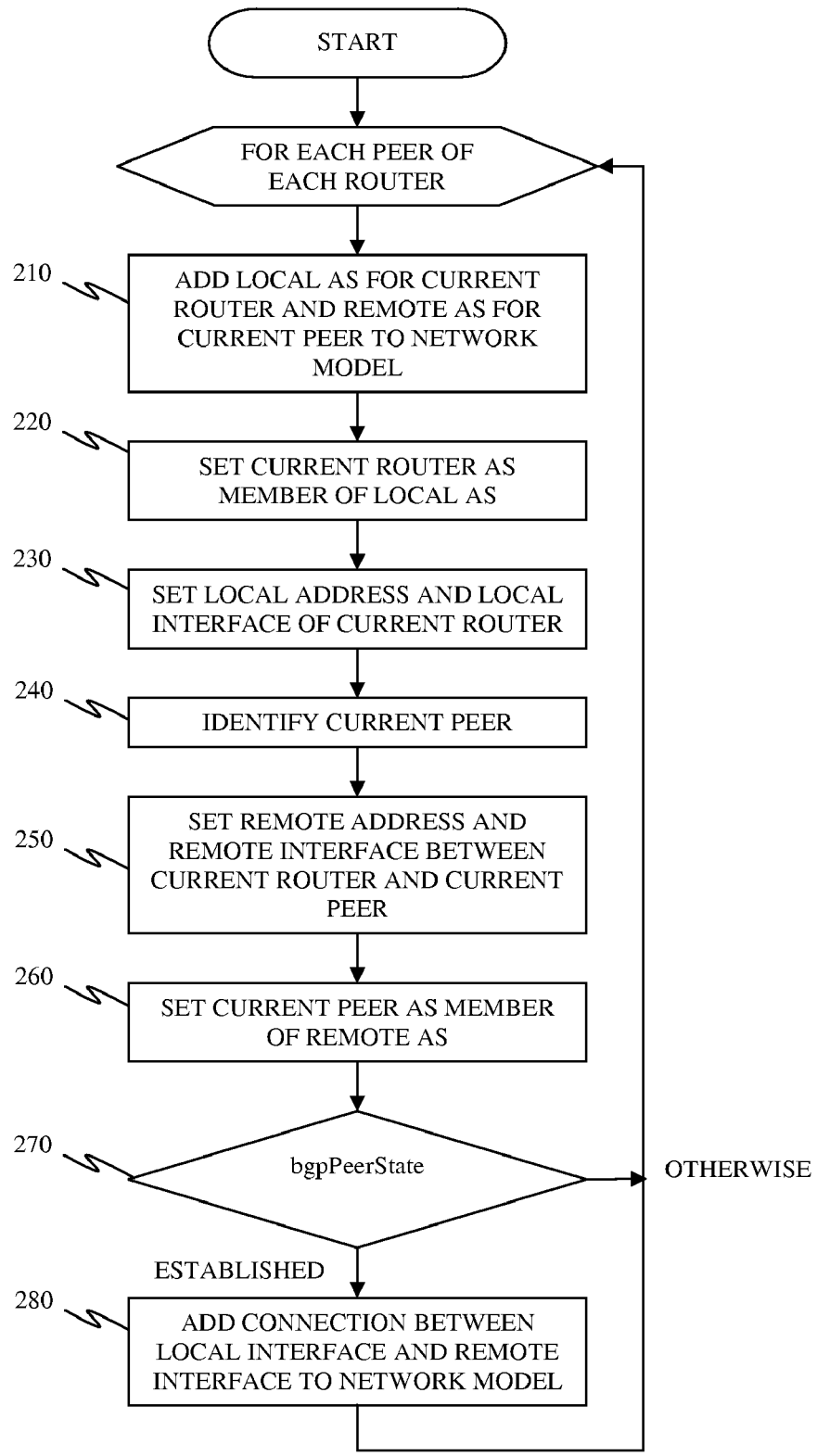
FIG. 2 is a flowchart depicting a method for building a network model by a network management application using Border Gateway Protocol (BGP) connections, in accordance with the embodiments of the present invention.

FIG. 2 is a flowchart depicting a method for building a network model by a network management application using Border Gateway Protocol (BGP) connections, in accordance with the embodiments of the present invention.

Initially the network management application discovers a router that also runs the Border Gateway Protocol (BGP), thus the router is known to be a member of an Autonomous System (AS) of a BGP network, and, for a respective peer of the router, a respective peer entry comprising a respective bgpLocalAs value, a respective bgpPeerIdentifier value, a respective bgpPeerState value, a respective bgpPeerLocalAddr value, a respective bgpPeerRemoteAddr value, and a respective bgpPeerRemoteAs value is available to the network management application. The network management application iterates the steps described below for each peer of each router in the AS that is administered by the network management application with the respective peer entry.

The network management application of the present invention builds a network model for administrative purposes using network reachability information in a routing protocol level, that is, Network Layer Reachability Information (NLRI) in the Border Gateway Protocol version 4 Management Information Base (BGP-4 MIB) to encompass as many network resources as possible within the network model. The network model comprises a list of Autonomous Systems (ASes) and a list of routers for each AS. The network model is instantiated with a respective peer entry representing the Border Gateway Protocol (BGP) network reachability information by the network management application. The list of ASes comprises ASes that the network management application has discovered in the network management application or created from the respective peer entry if the peer is not under administrative control of the user of the network management application or if the peer could not be accessed by the discovery processes. The list of routers for a respective AS comprises routers that the network management application has discovered in the network management application or created from the respective peer entry if the peer is not under administrative control of the user of the network management application or if the peer could not be accessed by the discovery process. The network model further comprises connections discovered in the network management application or created from the respective peer entry by the network management application as described in step 280, infra.

In step 210, the network management application adds a local AS and a remote AS for a current router to the network model using the bgpLocalAs value and the bgpPeerRemoteAs value, respectively. If the local AS is not listed yet in the list of ASes of the network model, the network management application creates and lists the local AS in the list of ASes of the network model. If the remote AS is not listed yet in the list of ASes of the network model, the network management application creates and lists the remote AS in the list of ASes of the network model.

In step 220, the network management application sets the current router as a member of the local AS and lists the current router in the list of routers for the local AS.

In step 230, the network management application specifies a local address of the current router and a local interface of the current router to the current peer by using the bgpPeerLocalAddr value of the peer entry for the current peer.

In step 240, the network management application inserts the current peer in the network model. If the current peer does not exist in the network model yet, the network management application creates a router data for the current peer from the bgpPeerIdentifier value of the peer entry for the current peer.

In step 250, the network management application specifies a remote address of the current peer and a remote interface of the current peer to the current router by using the bgpPeerRemoteAddr value of the peer entry for the current peer. In step 250, the network management application sets the remote router from step 250 as a member of a remote AS.

In step 260, the network management application sets the current peer as a member of the remote AS and lists the current peer in the list of routers for the remote AS.

In step 270, the network management application decides whether a connection between the current router and the current peer is in 'established' state. If the network management application decides that the connection is in 'established' state, the network management application proceeds with step 280. If the network management application decides that the connection is not in 'established' state, the network management application loops back to step 210 for a next peer of the router or of another router.

In step 280, the network management application makes a connection between the local interface from step 230 and the remote interface from step 250, and adds the connection to the network model.

By iterating steps 210, 220, 230, 240, 250, 260, 270, and 280 for each peer of each router in the AS, the network management application incorporates ASes, BGP routers and connectivity information in the constructed network model that is undiscoverable from a conventional network management application because of differences in network administrative controls. Also, the network management application discovers network devices within the same AS that is undiscoverable from the conventional network management application because of limited credential of a network device. As noted, the conventional network management application operating upon an OSI Application Layer network management protocol has complex requirements to discover a network device. The method of the present invention enables the network management application to discover network devices that does not meet requirements of network management protocols to be discovered by the network management application if the network device is connected in the OSI Network Layer through the BGP. The network management application of the present invention builds a BGP network model based on information gathered while discovering network entities by connecting interfaces of network entities.

Figure 3:
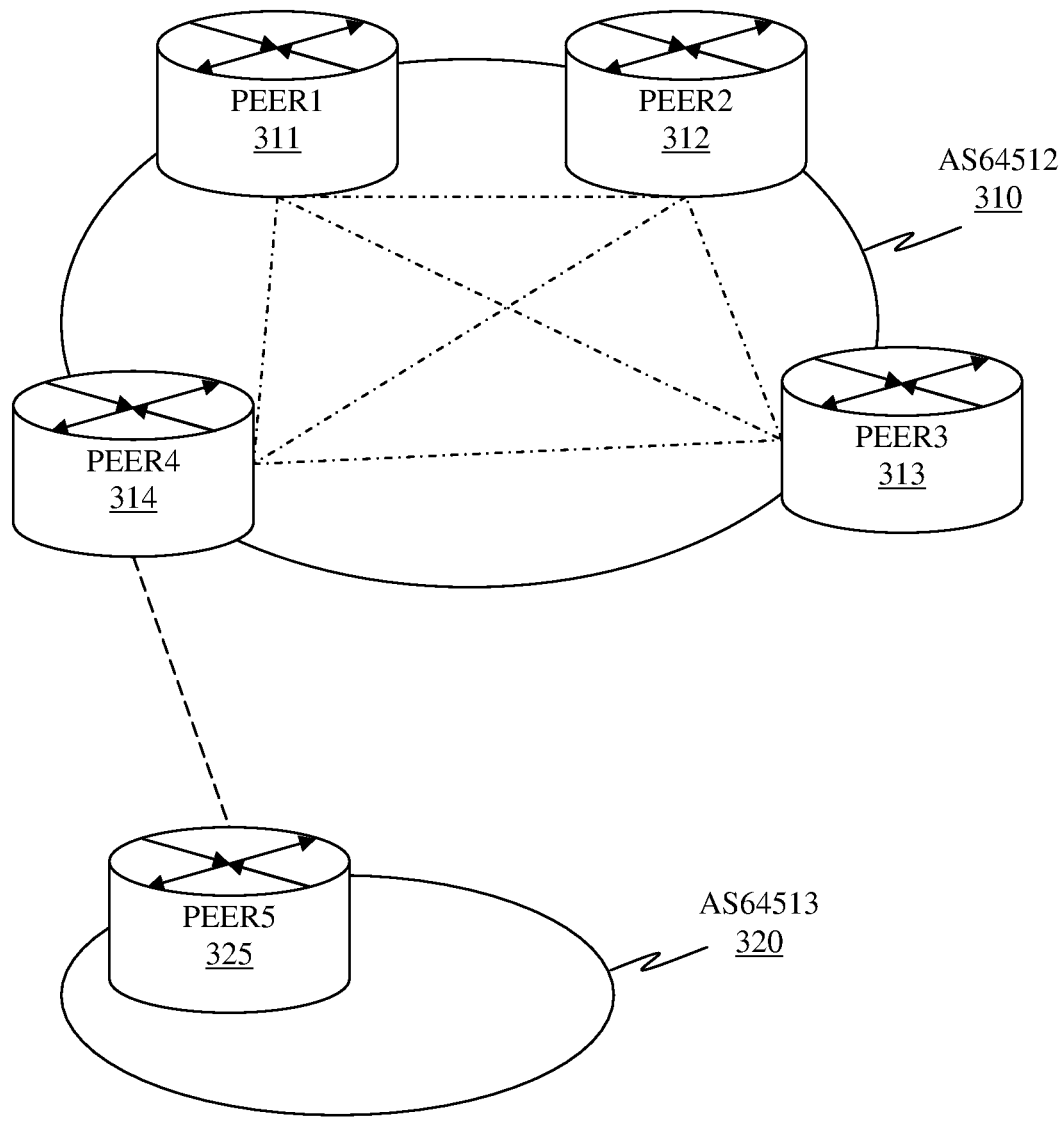
FIG. 3 illustrates an example BGP network, in accordance with embodiments of the present invention.

FIG. 3 illustrates an example Border Gateway Protocol (BGP) network 300, in accordance with embodiments of the present invention.

The example BGP network 300 comprises two Autonomous Systems (ASes) of AS64512 310 and AS64513 320, which are identified by a respective Autonomous System Number (ASN) 64512 and 64513.

The AS64512 310 comprises four routers of PEER1 311, PEER2 312, PEER3 313, and PEER4 314, which are all connected by iBGP connections with one another. The AS64512 310 is an Internet Service Provider (ISP) using a network management application that is able to discover the network administered by the ISP.

The AS64513 320 comprises PEER5 325 that is connected to the AS64512 via PEER4 314 by the External BGP. In other words, the AS64512 310 has a peering agreement with the AS64513 320 via an eBGP session from PEER4 314 to PEER5 325.

FIG. 3A illustrates an example configuration data for PEER4 of AS64512 in the Border Gateway Protocol (BGP) network 300 of FIG. 3, supra, in accordance with embodiments of the present invention.

Each column of the example 314E represents a peer entry for a peer of PEER∝router of AS64512. The example 314E comprises four peer entries for PEER1, PEER2, PEER3, and PEER5 that are reachable through iBGP/eBGP connections.

The network management application discovers the PEER4 router. A list of Autonomous Systems (ASes) stores the Autonomous System Number (ASN) for respective AS found in the BGP network. Each AS is associated with a list of routers for the AS that is initially empty. In this example, PEER2 is assumed to be undiscoverable in a network management protocol level due to defective device credentials of PEER2.

In the first column of the example 314E representing a peer entry for PEER1, the bgpLocalAs value 31411 is 64512 indicating that PEER4 is a member of AS64512, the bgpPeerIdentifier value 31412 is PEER1 indicating that the peer entry describes a connection between PEER4 and PEER1, the bgpPeerState value 31413 is 'established' indicating that the connection between PEER4 and PEER1 is established, the bgpPeerLocalAddr value 31414 is 172.20.1.7 indicating that PEER4 uses IP address 172.20.1.7 to access PEER1, the bgpPeerRemoteAddr value 31415 is 172.20.1.5 indicating that PEER1 uses IP address 172.20.1.5 to access PEER4, and the bgpPeerRemoteAs value 31416 is 64512 indicating that PEER1 is a member of AS64512 same as PEER4.

After performing steps of FIG. 2, supra, upon the peer entry for PEER1, the network management application discovering PEER4 has {64512} for the list of ASes, {PEER4, PEER1} for a list of routers for '64512' AS, and an interior interface between PEER4 and PEER1 is connected.

In the second column of the example 314E representing a peer entry for PEER2, the bgpLocalAs value 31421 is 64512 indicating that PEER4 is a member of AS64512, the bgpPeerIdentifier value 31422 is PEER2 indicating that the peer entry describes a connection between PEER4 and PEER2, the bgpPeerState value 31423 is 'established' indicating that the connection between PEER4 and PEER2 is established, the bgpPeerLocalAddr value 31424 is 172.20.1.7 indicating that PEER4 uses IP address 172.20.1.7 to access PEER2, the bgpPeerRemoteAddr value 31425 is 172.20.1.4 indicating that PEER2 uses IP address 172.20.1.4 to access PEER4, and the bgpPeerRemoteAs value 31426 is 64512 indicating that PEER2 is a member of AS64512 same as PEER4.

After performing steps of FIG. 2, supra, upon the peer entry for PEER2, the network management application running on PEER4 has {64512} for the list of ASes, {PEER4, PEER1, PEER2} for the list of routers for '64512' AS, the interior interface between PEER4 and PEER1 is connected, and an interior interface between PEER4 and PEER2 is connected.

In the third column of the example 314E representing a peer entry for PEER3, the bgpLocalAs value 31431 is 64512 indicating that PEER4 is a member of AS64512, the bgpPeerIdentifier value 31432 is PEER3 indicating that the peer entry describes a connection between PEER4 and PEER3, the bgpPeerState value 31433 is 'established' indicating that the connection between PEER4 and PEER3 is established, the bgpPeerLocalAddr value 31434 is 172.20.1.7 indicating that PEER4 uses IP address 172.20.1.7 to access PEER3, the bgpPeerRemoteAddr value 31435 is 172.20.1.6 indicating that PEER3 uses IP address 172.20.1.6 to access PEER4, and the bgpPeerRemoteAs value 31436 is 64512 indicating that PEER3 is a member of AS64512 same as PEER4.

After performing steps of FIG. 2, supra, upon the peer entry for PEER3, the network management application running on PEER4 has {64512} for the list of ASes, {PEER4, PEER1, PEER2, PEER3} for the list of routers for '64512' AS, the interior interface between PEER4 and PEER1 is connected, the interior interface between PEER4 and PEER2 is connected, and an interior interface between PEER4 and PEER3 is connected.

In the fourth column of the example 314E representing a peer entry for Peer5, the bgpLocalAs value 31451 is 64512 indicating that Peer4 is a member of AS64512, the bgpPeerIdentifier value 31452 is PEER5 indicating that the peer entry describes a connection between Peer4 and Peer5, the bgpPeerState value 31453 is 'established' indicating that the connection between Peer4 and Peer 5 is established, the bgpPeerLocalAddr value 31454 is indicating that Peer 4 accesses Peer 5 from IP address 10.10.10.1, the bgpPeerRemoteAddr value 31455 is 10.10.10.2 indicating that Peer 5 can be reached by Peer 4 using IP address 10.10.10.2, and the bgpPeerRemoteAs value 31456 is 64513 indicating that Peer 5 is a member of AS64513, which is different from Peer 4.

In the fourth column of the example 314E representing a peer entry for PEER5, the bgpLocalAs value 31451 is 64512 indicating that PEER4 is a member of AS64512, the bgpPeerIdentifier value 31452 is PEER5 indicating that the peer entry describes a connection between PEER4 and PEER5, the bgpPeerState value 31453 is 'established' indicating that the connection between PEER4 and PEER5 is established, the bgpPeerLocalAddr value 31454 is 10.10.10.1 indicating that PEER4 uses IP address 10.10.10.1 to access PEER5, the bgpPeerRemoteAddr value 31455 is 10.10.10.2 indicating that PEER5 uses IP address 10.10.10.2 to access PEER4, and the bgpPeerRemoteAs value 31456 is 64513 indicating that PEER5 is a member of AS64513, which is a new AS discovered in the BGP network.

After performing steps of FIG. 2, supra, upon the peer entry for PEER5, the network management application running on PEER4 has {64512, 64513} for the list of ASes, {PEER4, PEER1, PEER2, PEER3} for the list of routers for '64512' AS, {PEER5} for a list of routers for '64513' AS, the interior interface between PEER4 and PEER1 is connected, the interior interface between PEER4 and PEER2 is connected, the interior interface between PEER4 and PEER3 is connected, and an exterior interface between PEER4 and PEER5 is connected.

Figure 4:
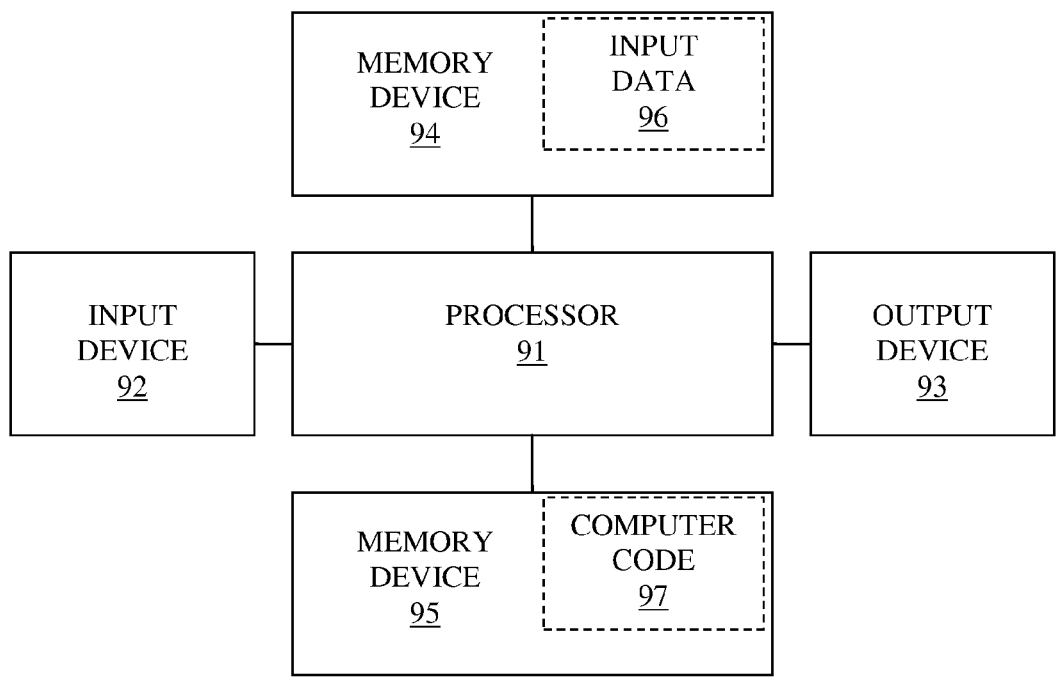
FIG. 4 illustrates a computer system used for discovering network entities by a network management application using BGP connections, in accordance with embodiments of the present invention.

FIG. 4 illustrates a computer system 90 used for discovering network entities by a network management application using BGP connections, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for discovering network entities using BGP connections according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for building a network model of a network for a network management application, the method comprising:

selecting a connection between a router and a peer, wherein the network model comprises the router, wherein the connection is made pursuant to a routing protocol of the network;

subsequent to said selecting, adding, to the network model, a first subnet comprising the router and a second subnet;

subsequent to said adding, specifying, in the network model, a local address of the router that identifies the router in the connection, and a local interface of the router that indicates a local termination point of the connection used with the local address;

subsequent to said specifying, inserting, in the network model, the peer and a remote address of the peer that identifies the peer in the connection, and a remote interface of the peer that indicates a remote termination point of the connection used with the remote address;

subsequent to said inserting, confirming that the second subnet comprises the peer in the network model;

subsequent to said confirming, appending a new connection between the local interface and the remote interface to the network model; and subsequent to said appending, transmitting the network model to an output device of a computer system, wherein said selecting, said adding, said specifying, said inserting, said confirming, said appending, and said transmitting are performed by the network management application running on the computer system.

2. The method of claim 1, the method further comprising: prior to said adding, creating the first subnet responsive to determining that the first subnet does not exist in the network management application.

3. The method of claim 1, the method further comprising: prior to said adding, creating the second subnet responsive to determining that the second subnet does not exist in the network management application.

4. The method of claim 1, the method further comprising: prior to said inserting, creating the peer responsive to determining that the peer does not exist in the network management application.

5. The method of claim 1, the method comprising: iterating, for a respective connection between a respective router in the network and a respective peer of the respective router, said selecting, said adding, said specifying, said inserting, said confirming, said appending, and said transmitting, wherein the respective connection is selected in said selecting in a respective iteration.

6. The method of claim 1, wherein the routing protocol of the network is the Border Gateway Protocol (BGP), wherein the first subnet and the second subnet are both a part of an Autonomous System of the Border Gateway Protocol (BGP AS).

7. The method of claim 1, wherein the network management application operates upon a network management protocol selected from a group consisting of the Telnet, the Secure Shell (SSH), the Simple Network Management Protocol (SNMP), and the Transaction Language 1 (TL1).

8. A computer program product, comprising a computer non-transitory storage medium having a computer readable program code embodied therein, said computer readable program code containing instructions that when executed by a processor of a computer system implement a method for building a network model of a network for a network management application, the method comprising:

selecting a connection between a router and a peer, wherein the network model comprises the router, wherein the connection is made pursuant to a routing protocol of the network;

subsequent to said selecting, adding, to the network model, a first subnet comprising the router and a second subnet;

subsequent to said adding, specifying, in the network model, a local address of the router that identifies the router in the connection, and a local interface of the router that indicates a local termination point of the connection used with the local address;

subsequent to said specifying, inserting, in the network model, the peer and a remote address of the peer that identifies the peer in the connection, and a remote interface of the peer that indicates a remote termination point of the connection used with the remote address;

subsequent to said inserting, confirming that the second subnet comprises the peer in the network model;

subsequent to said confirming, appending a new connection between the local interface and the remote interface to the network model; and subsequent to said appending, transmitting the network model to an output device of a computer system, wherein said selecting, said adding, said specifying, said inserting, said confirming, said appending, and said transmitting are performed by the network management application running on the computer system.

9. The computer program product of claim 8, the method further comprising: prior to said adding, creating the first subnet responsive to determining that the first subnet does not exist in the network management application.

10. The computer program product of claim 8, the method further comprising: prior to said adding, creating the second subnet responsive to determining that the second subnet does not exist in the network management application.

11. The computer program product of claim 8, the method further comprising: prior to said inserting, creating the peer responsive to determining that the peer does not exist in the network management application.

12. The computer program product of claim 8, the method comprising: iterating, for a respective connection between a respective router in the network and a respective peer of the respective router, said selecting, said adding, said specifying, said inserting, said confirming, said appending, and said transmitting, wherein the respective connection is selected in said selecting in a respective iteration.

13. The computer program product of claim 8, wherein the routing protocol of the network is the Border Gateway Protocol (BGP), wherein the first subnet and the second subnet are both a part of an Autonomous System of the Border Gateway Protocol (BGP AS).

14. The computer program product of claim 8, wherein the network management application operates upon a network management protocol selected from a group consisting of the Telnet, the Secure Shell (SSH), the Simple Network Management Protocol (SNMP), and the Transaction Language 1 (TL1).

15. A computer system comprising a processor and a computer readable non-transitory storage memory unit coupled to the processor, said memory unit containing instructions that when executed by the processor implement a method for building a network model of a network for a network management application, the method comprising:

selecting a connection between a router and a peer, wherein the network model comprises the router, wherein the connection is made pursuant to a routing protocol of the network;

subsequent to said selecting, adding, to the network model, a first subnet comprising the router and a second subnet;

subsequent to said adding, specifying, in the network model, a local address of the router that identifies the router in the connection, and a local interface of the router that indicates a local termination point of the connection used with the local address;

subsequent to said specifying, inserting, in the network model, the peer and a remote address of the peer that identifies the peer in the connection, and a remote interface of the peer that indicates a remote termination point of the connection used with the remote address;

subsequent to said inserting, confirming that the second subnet comprises the peer in the network model;

subsequent to said confirming, appending a new connection between the local interface and the remote interface to the network model; and subsequent to said appending, transmitting the network model to an output device of a computer system, wherein said selecting, said adding, said specifying, said inserting, said confirming, said appending, and said transmitting are performed by the network management application running on the computer system.

16. The computer system of claim 15, the method further comprising: prior to said adding, creating the first subnet responsive to determining that the first subnet does not exist in the network management application.

17. The computer system of claim 15, the method further comprising: prior to said adding, creating the second subnet responsive to determining that the second subnet does not exist in the network management application.

18. The computer system of claim 15, the method further comprising: prior to said inserting, creating the peer responsive to determining that the peer does not exist in the network management application.

19. The computer system of claim 15, the method comprising: iterating, for a respective connection between a respective router in the network and a respective peer of the respective router, said selecting, said adding, said specifying, said inserting, said confirming, said appending, and said transmitting, wherein the respective connection is selected in said selecting in a respective iteration.

20. The computer system of claim 15, wherein the routing protocol of the network is the Border Gateway Protocol (BGP), wherein the first subnet and the second subnet are both a part of an Autonomous System of the Border Gateway Protocol (BGP AS), and wherein the network management application operates upon a network management protocol selected from a group consisting of the Telnet, the Secure Shell (SSH), the Simple Network Management Protocol (SNMP), and the Transaction Language 1 (TL1).

* * * * *